(12) United States Patent
Chapel

(10) Patent No.: US 9,227,776 B2
(45) Date of Patent: Jan. 5, 2016

(54) TRAY FOR TRANSPORTING HORTICULTURAL CONTAINERS

(71) Applicant: Karl Ronald Chapel, Grand Haven, MI (US)

(72) Inventor: Karl Ronald Chapel, Grand Haven, MI (US)

( * ) Notice: Subject to any disclaimer, the term of this patent is extended or adjusted under 35 U.S.C. 154(b) by 84 days.

(21) Appl. No.: 13/716,195

(22) Filed: Dec. 16, 2012

(65) Prior Publication Data

US 2014/0166517 A1 Jun. 19, 2014

(51) Int. Cl.
*B65D 85/52* (2006.01)
*B65D 71/70* (2006.01)

(52) U.S. Cl.
CPC ............... *B65D 85/52* (2013.01); *B65D 71/70* (2013.01)

(58) Field of Classification Search
CPC ............ B65D 1/34; B65D 1/36; B65D 71/70; B65D 85/52; B65D 85/50; B65D 85/505; A47G 23/06; A47G 23/0633; A47G 23/0641
USPC ............... 206/217, 564, 423, 521.1; 229/406, 229/407, 904; D7/550.1, 551.2, 553.1, D7/553.2, 553.3, 553.4, 553.5; D9/755
See application file for complete search history.

(56) References Cited

U.S. PATENT DOCUMENTS

| | | |
|---|---|---|
| 3,151,761 A | 10/1964 | Cloyd et al. |
| 3,915,371 A | 10/1975 | Crabtree |
| 4,120,396 A | 10/1978 | Mascia et al. |
| 4,381,847 A | 5/1983 | Bessett et al. |
| 4,765,581 A | 8/1988 | Wallace et al. |
| 4,793,097 A | 12/1988 | Whitcomb |
| 4,803,806 A | 2/1989 | Ito |
| 4,919,381 A | 4/1990 | Buist |
| 4,962,855 A * | 10/1990 | Holmquist ............. 206/423 |
| 5,481,825 A | 1/1996 | Aoyama |
| 5,695,060 A | 12/1997 | Umiker |
| 6,125,577 A | 10/2000 | Merzweiler et al. |
| D438,100 S * | 2/2001 | Cekota ................... D9/755 |
| 6,453,613 B1 * | 9/2002 | Gratz ....................... 47/84 |
| 6,679,380 B2 * | 1/2004 | Brown ................... 206/427 |
| 6,827,207 B1 | 12/2004 | Chen |
| 6,851,276 B2 | 2/2005 | Perrins |
| 7,225,927 B2 | 6/2007 | Sweeney |
| 7,284,737 B2 | 10/2007 | Kane |
| 7,762,396 B1 * | 7/2010 | Yang et al. ............. 206/427 |
| 2004/0251703 A1 | 12/2004 | Griffith et al. |
| 2011/0120995 A1 * | 5/2011 | Landry ................. 220/23.8 |

FOREIGN PATENT DOCUMENTS

| | | |
|---|---|---|
| DE | 40 20 919 A1 | 1/1992 |
| DE | 93 12 895 U1 | 7/1994 |
| WO | 90/05447 A1 | 5/1990 |
| WO | 98/10687 | 3/1998 |
| WO | 2011/147020 A1 | 12/2011 |

* cited by examiner

*Primary Examiner* — Anthony Stashick
*Assistant Examiner* — Javier A Pagan
(74) *Attorney, Agent, or Firm* — Christopher G. Darrow; Darrow Mustafa PC

(57) ABSTRACT

Disclosed herein are embodiments of a tray for transporting a plurality of horticultural containers. The tray comprises: a plurality of connected container receiving pockets each having a bottom portion and an open distal portion opposite the bottom portion and sized to receive a horticultural container; and a plurality of tabs projecting into at least one of the pockets, each of the plurality of tabs including an upper end connected to the pocket below the open distal portion and extending downward at an angle to position a free distal end into the pocket with a bias against outward radial displacement.

20 Claims, 6 Drawing Sheets

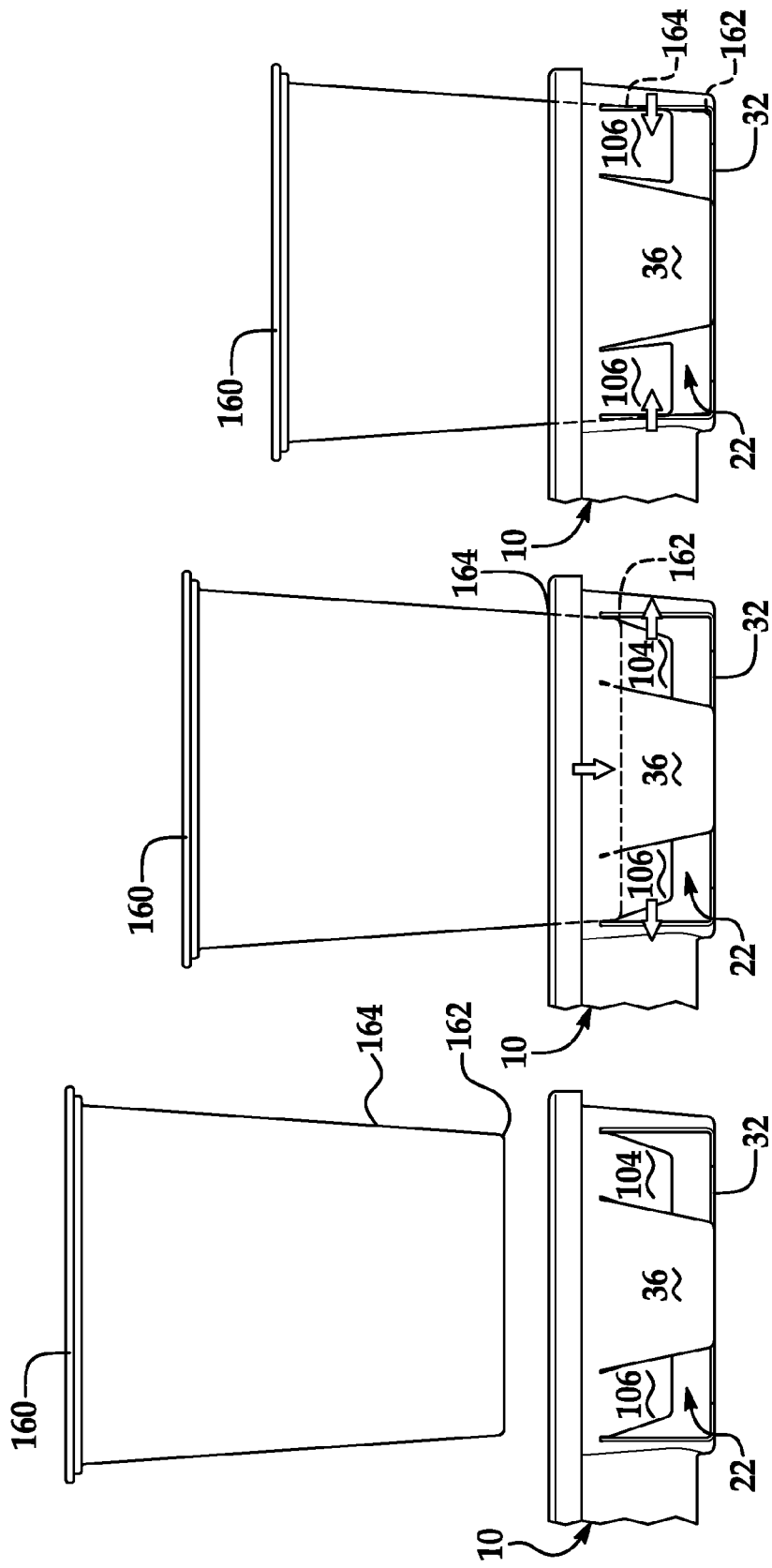

TRAY FOR TRANSPORTING HORTICULTURAL CONTAINERS

TECHNICAL FIELD

The embodiments disclosed herein generally relate to a tray for transporting a plurality of horticultural containers.

BACKGROUND

Horticultural growing containers, such as flower pots, are commonly filled and seeded in mass quantities at nurseries during large scale plant propagation operations. At the beginning stages of propagation, the containers can be loaded into trays configured to hold and arrange multiple containers. The loaded trays can serve as an efficient means for organizing, filling and seeding the containers at the nursery, for transporting containers with grown plants to retail centers, and for ultimately displaying the plants to consumers.

The trays can not only be utilized throughout the course of filling, planting, transportation and display of the containers, but can also, after being emptied of containers by retail consumers, be returned from the retail center to the nursery for re-use. However, the nursery may wish to re-use the tray with a different sized container. In addition, there may be substantial dimensional variation between commercially available containers, even among those of a certain size classification. Therefore, consumers of the trays may want trays configured to securely hold multiple different sized containers.

SUMMARY

Disclosed herein are embodiments of a tray for transporting a plurality of horticultural containers. In one aspect, a tray comprises: a plurality of connected container receiving pockets each having a bottom portion and an open distal portion opposite the bottom portion and sized to receive a horticultural container; and a plurality of tabs projecting into at least one of the pockets, each of the plurality of tabs including an upper end connected to the pocket below the open distal portion and extending downward at an angle to position a free distal end into the pocket with a bias against outward radial displacement.

In another aspect, a method of transporting a plurality of horticultural containers comprises: loading a bottom of a horticultural container within a first of a plurality of container receiving pockets included in a tray and having a bottom portion and an open distal portion opposite the bottom portion; engaging a side wall of the horticultural container with a plurality of tabs each including an upper end connected to the first pocket below the open distal portion and extending downward at an angle to position a free distal end into the first pocket with a bias against outward radial displacement; slidably engaging the side wall of the horticultural container with the plurality of tabs to radially displace the distal ends of the tabs with respect to the first pocket until the distal ends of the tabs engage the side wall of the horticultural container and apply radially inward tension thereto; and abutting the bottom of the horticultural container with the bottom portion of the first pocket.

In another aspect, a tray comprises: at least one container receiving pocket sized to receive a horticultural container and having a bottom portion, an open distal portion opposite the bottom portion and an upright side wall extending therebetween; four pocket openings defined by the upright side wall, the pocket openings equally circumferentially spaced with respect to the upright side wall and each having a peripheral upper edge below the open distal portion of the pocket; and a tab connected at each of the peripheral upper edges of the pocket openings, the tabs extending downward at an angle from the peripheral upper edges of the pocket openings to position a concave free distal end of the tab having a width greater than a length of the tab into the pocket with a bias against outward radial displacement.

These and other aspects will be described in additional detail below.

BRIEF DESCRIPTION OF THE DRAWINGS

The various features, advantages and other uses of the present apparatus will become more apparent by referring to the following detailed description and drawing in which:

FIGS. 6A-6C are plan views of the pocket of FIGS. 4 and 5 during receipt of a horticultural container.

DETAILED DESCRIPTION

Disclosed herein are embodiments of a tray for transporting a plurality of horticultural containers that is configured to securely hold multiple different sized containers.

Figure 1:
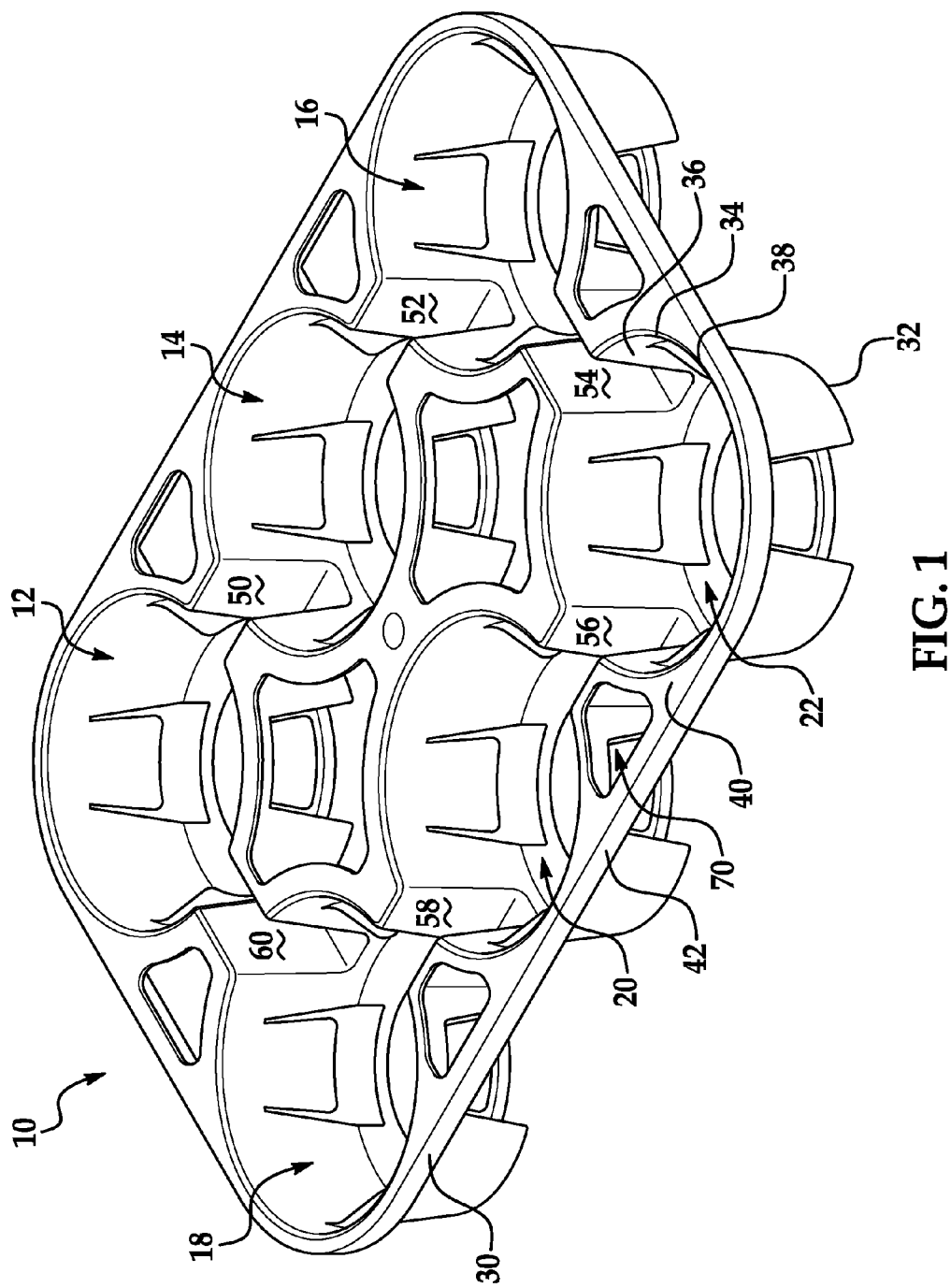
FIG. 1 is a perspective view of a tray for transporting a plurality of horticultural containers.
Figure 2:
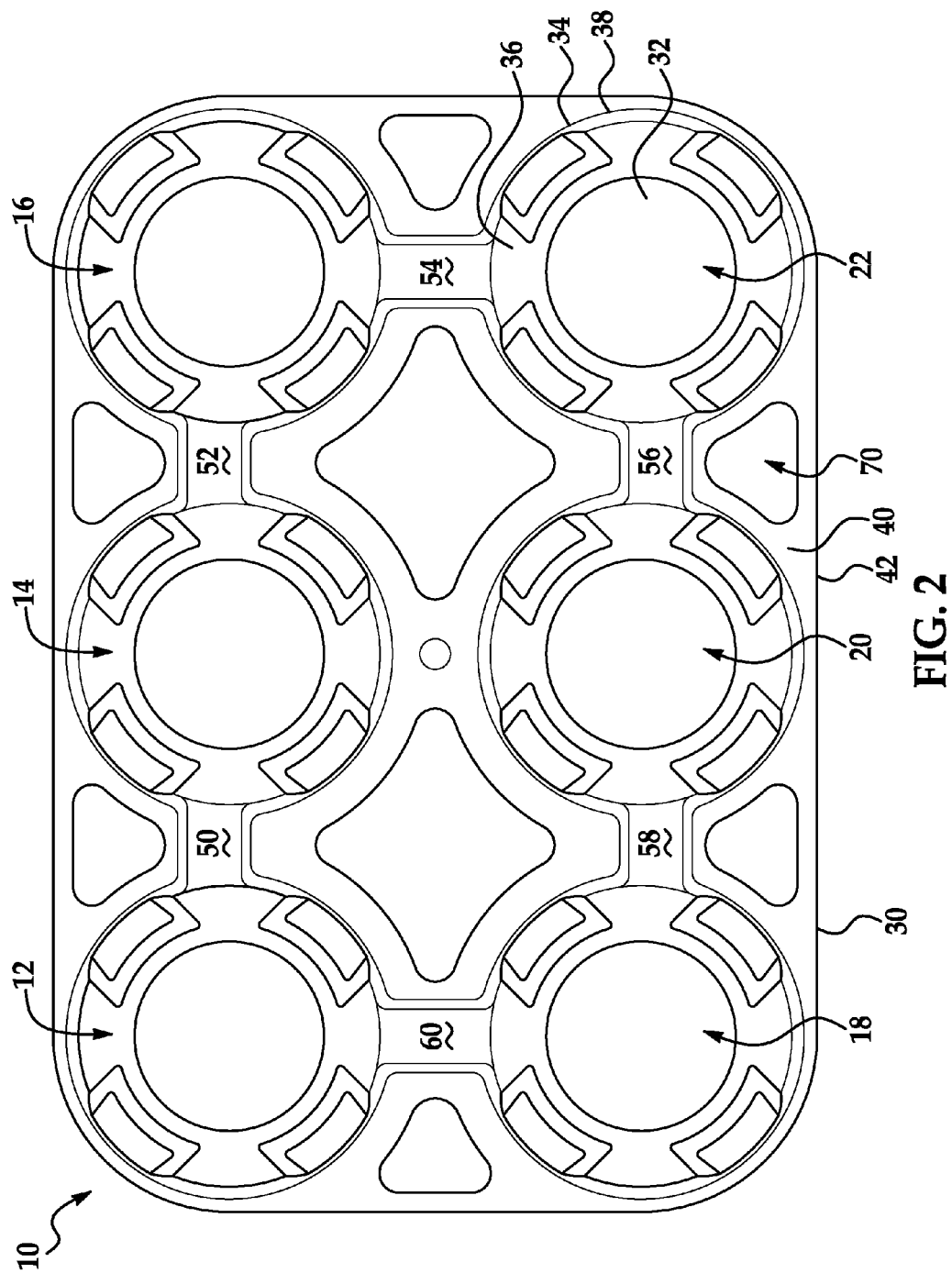
FIG. 2 is a top view of the tray of FIG. 1.
Figure 3:
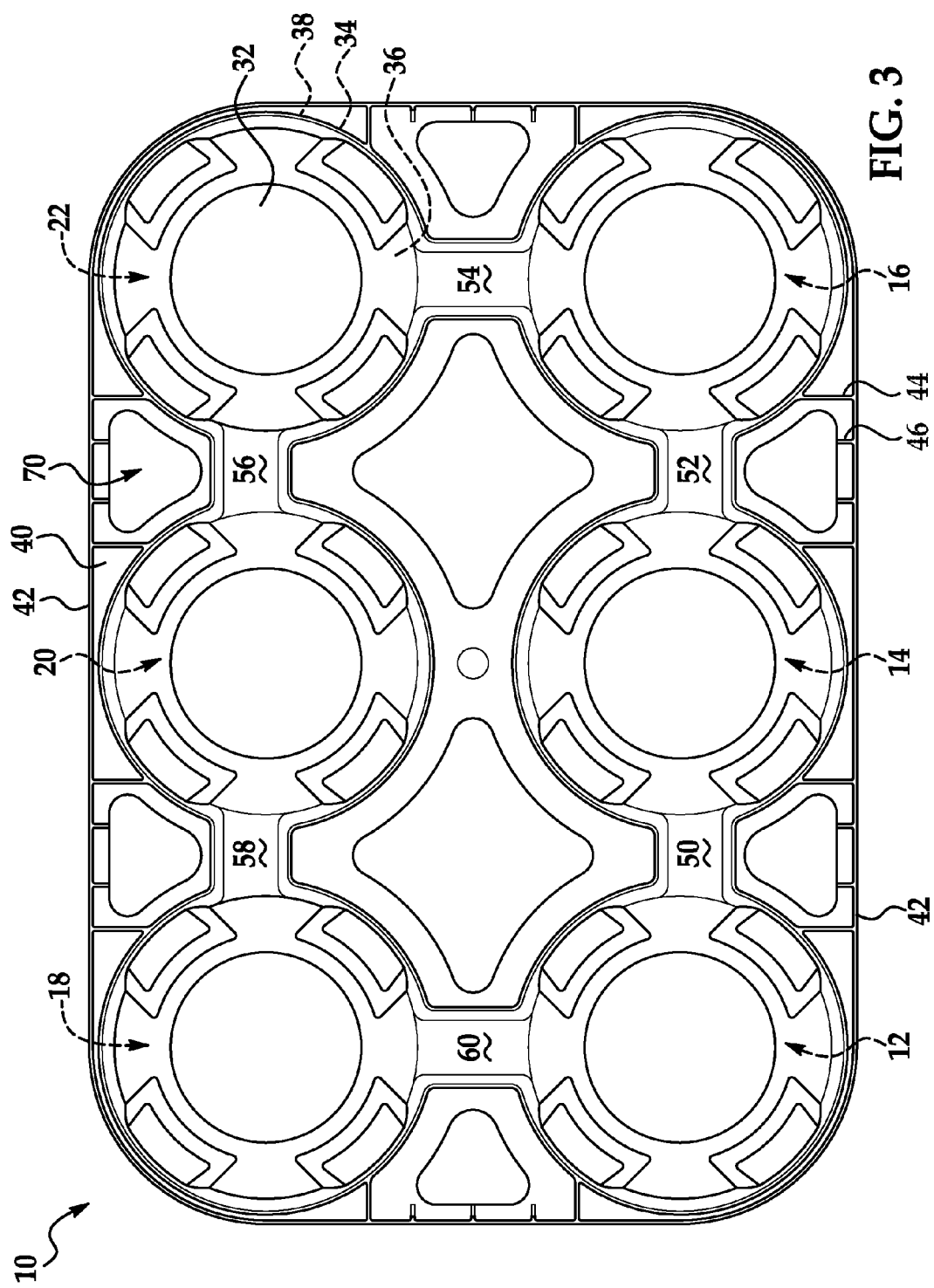
FIG. 3 is a bottom view of the tray of FIG. 1.

Referring to FIGS. 1-3, a tray 10 is generally composed of a plurality of connected container receiving pockets. The illustrated tray 10 includes a first pocket 12, a second pocket 14, a third pocket 16, a fourth pocket 18, a fifth pocket 20 and a sixth pocket 22. The six pockets 12, 14, 16, 18, 20 and 22 are arranged in a three-by-two array. As shown, the tray 10 includes a first row of pockets having the first pocket 12, the second pocket 14 and the third pocket 16 aligned in a longitudinal direction of the tray 10, and includes a second row of pockets having the fourth pocket 18, the fifth pocket 20 and the sixth pocket 22 similarly aligned in a longitudinal direction of the tray 10. The first and second rows of pockets are disposed side-by-side in a transverse direction of the tray 10, such that the tray 10 has a generally rectangular outer profile 30. It will be understood that the illustrated tray 10 is provided as a non-limiting example, and that the tray 10 could include an alternative number and/or arrangement of pockets.

Each of the six pockets 12, 14, 16, 18, 20 and 22 are generally shaped as hollow, frustoconical members that are sized and configured for receiving a horticultural container, such as a flower pot, that is used for cultivation and transport of flowers or other plants. Such containers are commonly composed of polymeric materials, although the tray 10 can be compatible with containers composed of other materials, such as wood or stone.

The six pockets 12, 14, 16, 18, 20 and 22 are similarly constructed, although they may vary in position or orientation with respect to the tray 10. The description herein follows where possible with representative reference to the sixth pocket 22. Where a structural aspect of the sixth pocket 22 is illustrated and/or described, the other pockets 12, 14, 16, 18 and 20 of the tray 10 should be understood as being constructed similarly in principle.

With reference to the sixth pocket 22, each of the pockets have a bottom surface 32, an open distal portion 34 opposite the bottom surface 32, and an outwardly tapering upright side wall 36 extending between the bottom surface 32 and the open distal portion 34. The illustrated pocket 22 has a substantially circular cross section, although the pocket 22 could alternatively have an oval, oblong or polygonal cross section, for example.

In the illustrated example of the tray 10, a diameter of the pocket 22 at the bottom surface 32 is approximately 5 inches, a diameter of the pocket 22 at the open distal portion 34 is approximately 5.5 inches, and the pocket 22 has a depth of approximately 2.5 inches. With the other pockets 12, 14, 16, 18 and 20 similarly sized, the tray 10 can have an overall length in the longitudinal direction of approximately 19 inches, and an overall width in the transverse direction of approximately 13 inches.

The open distal portion 34 of the pocket 22 terminates at a lip 38. Similar lips of the other pockets 12, 14, 16, 18 and 20 included in the tray 10 are oriented in a common plane and interconnected by a generally planar upper surface 40 of the tray. The upper surface 40 of the tray 10 generally extends between the lips of the pockets 12, 14, 16, 18, 20 and 22 in the common plane, and terminates according to the generally rectangular outer profile 30 of the tray 10.

The upper surface 40 of the tray 10 can include an overturned rim 42 at its outer periphery for additional strength and rigidity. Referring specifically to FIG. 3, the tray 10 can also optionally include a number of ribs 44, an example of which is shown extending between an inside of the overturned rim 42 of the upper surface 40 and the pocket 22. In addition, the tray 10 can optionally include a number of gussets 46, an example of which is shown extending between the inside of the overturned rim 42 and the upper surface 40.

The upper surface 40 of the tray 10 can additionally define one or more U-shaped cross-channels connecting portions of the upright side walls of laterally and/or transversely adjacent pockets 12, 14, 16, 18, 20 or 22. The illustrated upper surface 40 of the tray 10 includes six U-shaped cross-channels 50, 52, 54, 56, 58 and 60. As shown, a first U-shaped cross-channel 50 extends longitudinally between portions of the upright side walls of the first pocket 12 and the second pocket 14, a second U-shaped cross-channel 52 extends longitudinally between portions of the upright side walls of the second pocket 14 and the third pocket 16, a third U-shaped cross-channel 54 extends transversely between portions of the upright side walls of the third pocket 16 and the sixth pocket 22, a fourth U-shaped cross-channel 56 extends longitudinally between portions of the upright side walls of the sixth pocket 22 and the fifth pocket 20, a fifth U-shaped cross-channel 58 extends longitudinally between portions of the upright side walls of the fifth pocket 20 and the fourth pocket 18, and a sixth U-shaped cross-channel 60 extends transversely between portions of the upright side walls of the fourth pocket 18 and the first pocket 12.

In the illustrated example of the tray 10, each of the U-shaped cross-channels 50, 52, 54, 56, 58 and 60 extend in a direction parallel to imaginary lines extending normally between radial axes of adjacent pockets 12 and 14, adjacent pockets 14 and 16, adjacent pockets 16 and 22, adjacent pockets 22 and 20, adjacent pockets 20 and 18 and adjacent pockets 18 and 12, respectively. The transversely extending U-shaped cross-channels 54 and 60 extend along the respective imaginary lines, while the longitudinally extending U-shaped cross-channels 50, 52, 56 and 58 extend offset from respective the imaginary lines in an outward direction, that is, toward the outer periphery of the upper surface 40 at the outer profile 30 of the tray 10.

The upper portions of the U-shaped cross-channels 50, 52, 54, 56, 58 and 60 are disposed at the upper surface 40 of the tray 10, with vertexes extending toward the bottom surfaces of the pockets 12, 14, 16, 18, 20 and 22. In the illustrated example of the tray 10, the U-shaped cross-channels 50, 52, 54, 56, 58 and 60 have widths at the upper portions that are approximately 1.25 inches. The U-shaped cross-channels 50, 52, 54, 56, 58 and 60 additionally have a depth from the upper surface 40 of the tray 10 such that the respective vertexes thereof are disposed proximate to the bottom portions of the pockets 12, 14, 16, 18, 20 and 22. For example, the depth can be approximately 2.25 inches. It will be understood that the shape, size, number or orientation of the U-shaped cross-channels 50, 52, 54, 56, 58 and 60 can vary from that specifically illustrated and described according to strength, rigidity, aesthetic, cost or any other design criteria for the tray 10, and could also vary with differences in the number and/or arrangement of the pockets 12, 14, 16, 18, 20 and 22 included in the tray 10.

As shown, the upper surface 40 of the tray 10 can also include optional cutouts 70, an example of which is defined by the upper surface 40 between the fifth pocket 20, the sixth pocket 22, the U-shaped cross-channel 56 and the outer profile 30 of the tray 10 at the upper surface 40. The cutout 70 can generally be provided to save weight and material cost during production of the tray 10, but could also be provided for other reasons relating, for example, to functional or aesthetic considerations. The geometry of the illustrated cutouts 70 is such that the material of the upper surface 40 of the tray 10 is removed except for material bordering each of the pockets 12, 14, 16, 18, 20 and 22, U-shaped cross-channels 50, 52, 54, 56, 58 and 60, and the outer profile 30 of the tray 10. The shape, size, number or orientation of the cutouts 70 can vary from that specifically illustrated and described according to strength, rigidity, aesthetic, cost or any other design criteria for the tray 10, and could also vary with differences in the number and/or arrangement of the pockets 12, 14, 16, 18, 20 and 22, and of the U-shaped cross-channels 50, 52, 54, 56, 58 and 60 included in the tray 10.

The configuration of the exemplary sixth pocket 22 is described with reference to FIGS. 4 and 5. The pocket 22 includes a plurality of tabs extending therein. As shown, the pocket 22 includes four tabs 100, 102, 104 and 106 equally spaced about a circumference of the pocket 22. The tabs 100, 102, 104 and 106 are generally arranged as a first pair of opposed tabs 100 and 104, and a second pair of opposed tabs 102 and 106. The tabs 100, 102, 104 and 106 are arranged diagonally with respect to the longitudinal and transverse directions of the tray 10, such that the U-shaped cross-channel 54 extends between adjacent tabs 100 and 102, and the U-shaped cross-channel 56 extends between adjacent tabs 100 and 106. It will be understood that the illustrated pocket 22 is provided as a non-limiting example, and that the pocket 22, or the pockets 12, 14, 16, 18 and 20, could include an alternative number and/or arrangement of tabs.

Each of the four tabs 100, 102, 104 and 106 are configured to resiliently project into the pocket 22 with a bias against outward radial displacement, and are operative to allow the pocket 22 to accept horticultural containers with differing shapes and/or sizes. Specifically, the pocket 22 with the tabs 100, 102, 104 and 106 can tensionably receive horticultural containers ranging in size from those nearing the size of the pocket 22 itself, to those having a size slightly larger than a portion of the pocket 22 radially inward of the tabs 100, 102, 104 and 106. Thus, the tray 10, with pockets 12, 14, 16, 18 and 20 constructed with tabs similarly to the pocket 22, has many advantageous applications. For instance, the tray 10 may be used with containers of a certain size, and then reused with different sized containers, the tray 10 can accommodate the dimensional variations between commercially available containers of a similar size classification, or the tray 10 can apply tension to containers of a size nearing the size of the pockets 12, 14, 16, 18, 20 and 22.

The four tabs 100, 102, 104 and 106 are similarly constructed, although they may vary in position or orientation with respect to the exemplary pocket 22. The description herein follows where possible with representative reference to the tab 100. Where a structural aspect of the tab 100 is illustrated and/or described, the other tabs 102, 104 and 106 of the pocket 22 should be understood as being constructed similarly in principle.

The tab 100 may be formed integrally with the tray 10 through an injection molding process, for example. The illustrated tab 100 is integrally formed with the side wall 36 of the pocket 22 at an angle with respect to the side wall 36, as described in further detail below, although the tab 100 could be otherwise formed with the tray 10. The angle can depend on a variety of design criteria, for example, the size and shape of the tab 100, the amount of desired projection into the pocket 22, or the amount of tension to be applied by the tab 100. In the illustrated example, the angle of projection for the tab 100 may be approximately 15 degrees, although the angle of projection for the tab 100 could be larger, for example, approximately 30 to 35 degrees. The material of the tray 10 can be selected such that the tab 100 resiliently projects into the pocket 22 with a bias against outward radial displacement, but can be outwardly radially displaced with respect to the pocket 22 through interference with a horticultural container that is being lowered into the pocket 22. For example, the tray 10 can be composed of a recyclable polymeric material suitable for injection molding, such as polypropylene, although the tray 10 could be composed of alternative or additional materials.

As shown, the tab 100 extends from one of four pocket openings 110 defined by the pocket 22, which, like the four tabs 100, 102, 104 and 106, are equally spaced about the circumference of the pocket 22. The illustrated pocket opening 110 generally includes an outer bottom aperture 112 defined by the bottom surface 32, in communication with a side wall aperture 114 defined by the upright side wall 36 extending between the bottom surface 32 and the open distal portion 34.

The outer bottom aperture 112 has a curvilinear radially inner peripheral edge 120. The radially inner peripheral edge 120 is concentric with a radial axis of the pocket 22. In the illustrated example of the outer bottom aperture 112, a diameter of the radially inner peripheral 120 edge is approximately 3.75 inches. The outer bottom aperture 112 further has a curvilinear radially outer peripheral edge 122 opposite the radially inner peripheral edge 120. The radially outer peripheral edge 122 is concentric with a radial axis of the pocket 122 and occurs at the outer periphery of the bottom surface 32, at an intersection between the bottom surface 32 and the upright side wall 36. The outer bottom aperture 112 has opposed edges 124 and 126 connecting between the radially inner peripheral edge 120 and the radially outer peripheral edge 122. The opposed edges 124 and 126 are substantially parallel, and extend in a plane of the bottom surface 32 at an outward angle from the radial direction of the pocket 22. In the illustrated example of the outer bottom aperture 112, a width between the opposed edges 124 and 126 can be approximately 2 inches.

In addition to the outer bottom aperture 112, the bottom surface 32 defines an inner aperture 128 with an outer peripheral edge concentric with a longitudinal axis of the pocket 22 and disposed radially inward of the radially inner peripheral edge 120 of the outer bottom aperture 112. Although the illustrated inner aperture 128 is circular, the inner aperture 128 could have an alternative geometry. In the illustrated example of the bottom surface 32, a diameter of the inner aperture 128 is approximately 3.25 inches.

Figure 5:
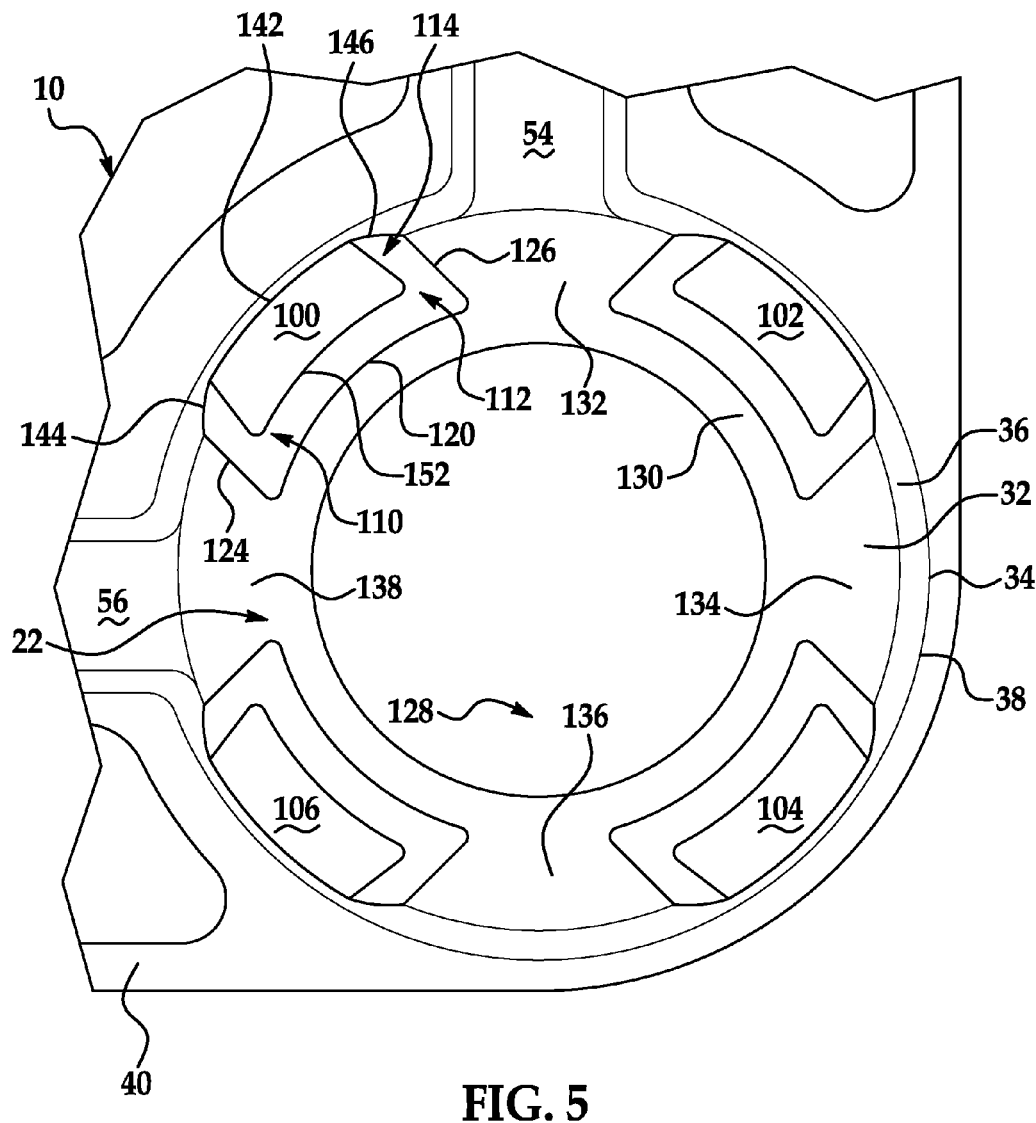
FIG. 5 is a detailed top view of the tray of FIG. 1 showing details of the pocket.

As best shown in FIG. 5, it can be seen that the above described bottom surface 32 of the illustrated pocket 22 is generally configured as an annular disk 130 supported by a plurality of radially extending spokes 132, 134, 136 and 138 connecting the annular disk 130 to the upright side wall 36 of the pocket 22. Where the opposed edges 124 and 126 of the outer bottom aperture 112 are substantially parallel, as described above, each of the spokes 132, 134, 136 and 138 is generally configured as radially inwardly directed wedge shaped member.

As described above, the illustrated pocket opening 110 includes a side wall aperture 114 defined by the upright side wall 36 in communication with the outer bottom aperture 112 defined by the bottom surface 32. The side wall aperture 114 includes a curvilinear bottom edge 140. The bottom edge 140 is common to the radially outer peripheral edge 122 of the outer bottom aperture 112, and is likewise concentric with a radial axis of the pocket 122 and occurs at the outer periphery of the bottom surface 32, at an intersection between the bottom surface 32 and the upright side wall 36. The side wall aperture 114 further includes a top edge 142 opposite the bottom edge 140. The top edge 142 is concentric with a radial axis of the pocket 22 and occurs at the upright side wall 36 at a predetermined distance from the bottom surface 32 of the pocket 22. The predetermined distance can optionally be such that the top edge 142 occurs at an upper half of the side wall 36, which may, for example, include the lip 38, although the top edge 142 could alternatively occur otherwise at the side wall 36. In the illustrated example of the side wall aperture 114, the predetermined distance is approximately 1.75 inches.

The side wall aperture 114 further has opposed side edges 144 and 146 connecting between the bottom edge 140 and the top edge 142. As shown, the illustrated opposed side edges 144 and 146 generally extend at an inward angle from the bottom edge 140 to the top edge 142. In the illustrated example of the side wall aperture 114, a distance between the opposed side edges 144 and 146 is approximately 2 inches at the bottom edge 140 of the side wall aperture 114, while a distance between the opposed side edges 144 and 146 is approximately 1.5 inches at the top edge 142.

It can be seen that the illustrated pocket opening 110 includes an outer periphery including the top edge 142 of the side wall aperture 114, occurring at the upright side wall 36 at the predetermined distance from the bottom surface 32 of the pocket 22, as well as the opposed side edges 144 and 146 of the side wall aperture 114. In addition, the outer periphery of the pocket opening 110 may include the opposed edges 124 and 126 of the outer bottom aperture 112, which are respectively coterminous with the edges 144 and 146 of the side wall aperture 114. Finally, the outer periphery of the pocket opening 110 may include the radially inner peripheral edge 120 of the outer bottom aperture 112. It will be understood that the shape, size, number or orientation of the pocket opening 110 and other pocket openings of the pocket 22 can vary from that specifically illustrated and described according to strength, rigidity, aesthetic, cost or any other design criteria for the tray 10. In addition, while the illustrated pocket opening 110 includes the outer bottom aperture 112 in communication with a side wall aperture 114, the outer bottom aperture 112 need not be included.

Figure 4:
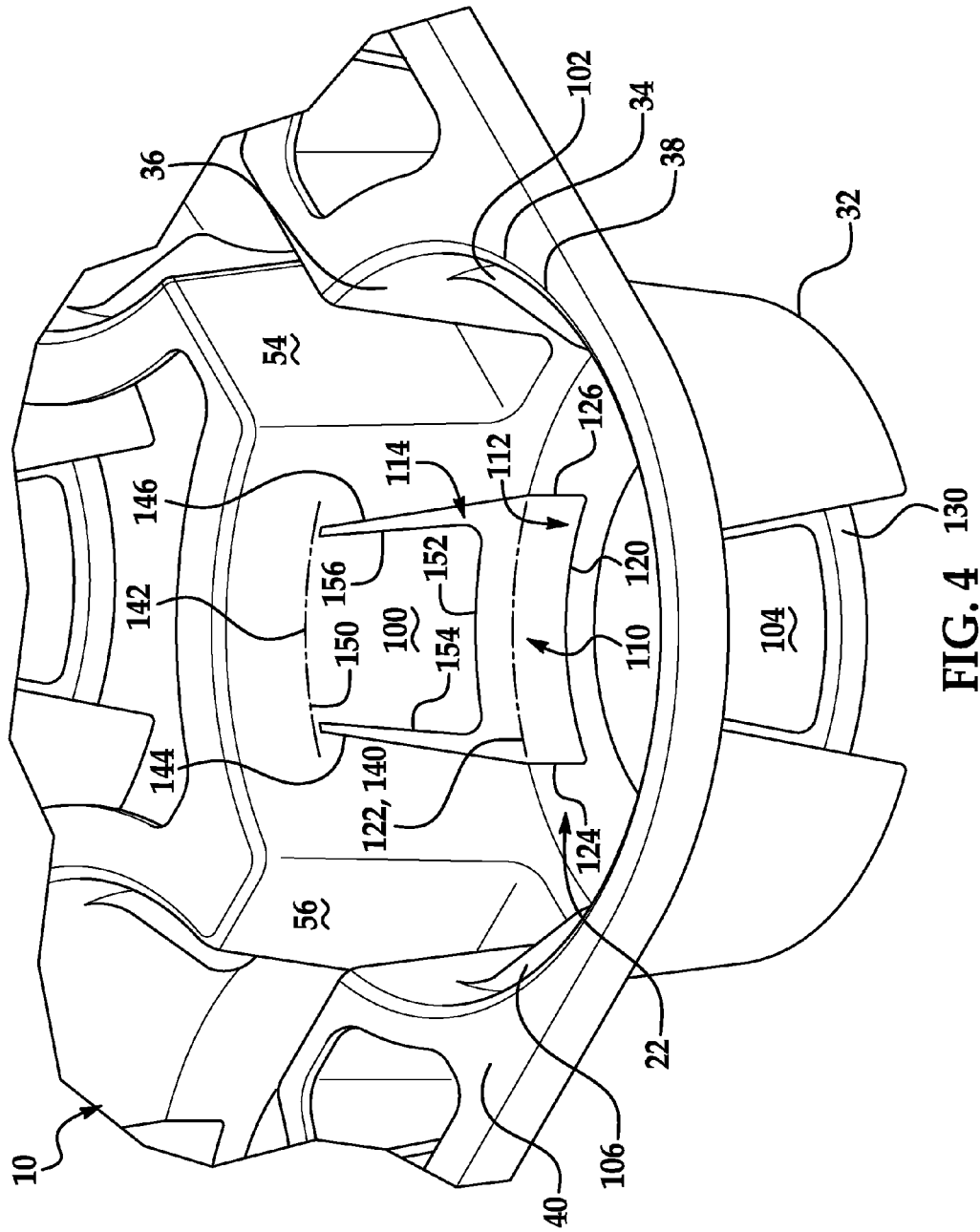
FIG. 4 is a detailed perspective view of the tray of FIG. 1 showing details of a pocket.

As best shown in FIG. 4, the tab 100 includes a first end 150 connected to the side wall 36 at the top edge 142 of the pocket opening 100. Accordingly, as described above, the first end 150 of the tab 100 may be connected to the side wall 36 at an upper half of the side wall 36, which may, for example, include the lip 38, although the first end 150 of the tab 100 could alternatively be connected otherwise to the side wall 36. The tab 100 generally extends from the top edge 142 at an angle with respect to the side wall 36 to project a free distal end 152 of the tab 100 opposite the first end 150 into the pocket 22. The free distal end 152 projected into the pocket 22 is concave, such that corresponding distal ends of the tabs 102, 104 and 106 form a partial circular profile approximating that of a cross section of a horticultural container to be placed into the pocket 22. Thus, the distal ends tabs 102, 104 and 106 are operative to fully seat against a horticultural container received within the pocket 22 while the container is being tensionably engaged.

The tab 100 further includes opposed side edges 154 and 156 extending between the first end 150 and the distal end 152. In the illustrated example of the tab 100, a distance between the opposed side edges 154 and 156 is approximately 1.375 inches at the first end 150, while a distance between the opposed side edges 154 and 156 is approximately 1.5 inches at the distal end 152. Thus, the opposed side 154 and 156 edges generally extend at an outward angle from the first end 150 connected to the side wall 36 to the free distal end 152, such that a width of the tab 100 at the free distal end 152, which projects into the pocket 22 to seat against a horticultural container, is larger than a width of the tab 100 at the first end 150.

The opposed side 154 and 156 edges also generally extend according to the respective opposed side edges 144 and 146 of the pocket opening 110, so as to provide clearance when radially displaced into the side wall 36 of the pocket 22, as shown with additional reference to FIGS. 6A-6C.

In FIG. 6A, a horticultural container 160 is disposed above the pocket 22, with the tabs 100, 102, 104 and 106 (the tabs 104 and 106 are shown in this view) resiliently projecting into the pocket 22, as explained above, with a bias against outward radial displacement. In FIG. 6B, a bottom 162 of the container 160 is lowered with respect to the pocket 22 until the container 160 is partially disposed within the pocket 22. The bottom 162 of the container 160 engages the tabs 104 and 106, at a position upward of the free distal ends. As the container 160 continues to be lowered with respect to the pocket 22, a side wall 164 of the container 160 slidably engages the tabs 104 and 106, applying a radially outer force to the tabs 104 and 106 and overcoming the bias against outward radial displacement.

As shown in FIG. 6C, when the container 160 is fully received within the pocket 22, such that the bottom 162 of the container 160 abuts the bottom surface 32 of the pocket 22, the free distal ends of the tabs 104 and 106 tensionably engage and seat against the side wall 164 of the container 160. For the illustrated container 160, which is of a size nearing the size of the pocket 22, the tabs 104 and 106 are radially displaced into the side wall 36 of the pocket 22, with clearance provided by the pocket aperture 110 along the opposed side edges 144 and 146.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A tray for transporting a plurality of horticultural containers, comprising:
    a plurality of connected container receiving pockets each sized to receive a horticultural container and having a bottom portion, an open distal portion opposite the bottom portion and an upright side wall extending therebetween, the pockets each defining one or more pocket openings framed in part by a peripheral upper edge at the pocket's upright sidewall and concentric with a central axis of the pocket; and
    for each of the pocket openings, a corresponding tab projecting into the pocket defining the pocket opening, each tab including an upper end connected to the pocket only at the peripheral upper edge framing the pocket opening and extending downward at a constant angle to position a free distal end into the pocket with a bias against outward radial displacement.

2. The tray of claim 1, wherein the free distal end of the tab is concave.

3. The tray of claim 1, wherein a width of the tab at the free distal end is greater than a length of the tab.

4. The tray of claim 1, wherein the angle is greater than approximately 15 degrees but less than approximately 35 degrees.

5. The tray of claim 1, wherein the one or more pocket openings include two pairs of oppositely positioned pocket openings, further comprising:
    two pairs of oppositely positioned tabs respectively corresponding to the two pairs of oppositely positioned pocket openings.

6. The tray of claim 1, further comprising:
    the plurality of connected container receiving pockets including adjacent first and second pockets each having an upright side wall;
    an upper surface connecting the open distal portions of the first and second pockets; and
    a cross-channel defined by the upper surface and extending between the upright side walls of the first and second pockets.

7. The tray of claim 6, wherein the cross-channel is disposed between two adjacent of the one or more pocket openings.

8. The tray of claim 6, wherein a vertex of the cross-channel is disposed proximate to the bottom portions of the first and second pockets.

9. The tray of claim 6, wherein the cross-channel extends offset from an imaginary line extending between respective radial axes of the first and second pockets.

10. The tray of claim 1, further comprising:
    the plurality of connected container receiving pockets including six pockets arranged in a three-by-two array.

11. The tray of claim 1, wherein an entire width of the free distal end of the tab frames at least a partial profile concentric with the central axis of the pocket and similarly shaped, but smaller than, the pocket's cross sectional profile.

12. A tray for transporting a plurality of horticultural containers, comprising:
    a plurality of connected container receiving pockets each sized to receive a horticultural container and having a bottom portion, an open distal portion opposite the bottom portion and an upright side wall extending therebetween, the pockets each defining one or more pocket openings framed in part by a peripheral upper edge at the pocket's upright sidewall; and for each of the pocket openings, a corresponding tab connected at the peripheral upper edge framing the pocket opening, the tabs extending downward at a constant angle from the peripheral upper edges of the pocket openings to position free distal ends having widths greater than lengths of the tabs into the pocket with a bias against outward radial displacement, the entire widths of the free distal ends of the tabs framing at least a partial profile concentric with a central axis of the pocket and similarly shaped, but smaller than, the pocket's cross sectional profile.

13. The tray of claim 12, wherein the peripheral upper edge framing the pocket is concentric with the central axis of the pocket, and the upper end of each tab is connected to the pocket only at the peripheral upper edge.

14. The tray of claim 12, wherein the free distal ends of the tabs are concave.

15. The tray of claim 12, wherein the angle is greater than approximately 15 degrees but less than approximately 35 degrees.

16. The tray of claim 12, further comprising:
the plurality of connected container receiving pockets including six pockets arranged in a three-by-two array.

17. A tray for transporting a plurality of horticultural containers, comprising:
a plurality of connected container receiving pockets each sized to receive a horticultural container and having a bottom portion, an open distal portion opposite the bottom portion and an upright side wall extending therebetween, the pockets each defining one or more pocket openings framed by a peripheral upper edge at the pocket's upright sidewall, a peripheral bottom edge at the pocket's bottom portion and opposing side edges extending from the pocket's upright sidewall to the pocket's bottom portion, wherein both the peripheral bottom edge and the peripheral upper edge are concentric with a central axis of the pocket; and for each of the pocket openings, a corresponding tab projecting into the pocket defining the pocket opening, each tab including an upper end connected to the pocket at the peripheral upper edge framing the pocket opening and extending downward at a constant angle to position a free distal end into the pocket with a bias against outward radial displacement.

18. The tray of claim 17, wherein the upper end of each tab is connected to the pocket only at the peripheral upper edge.

19. The tray of claim 17, wherein a width the tab at the free distal end is greater than a length of the tab.

20. The tray of claim 17, wherein an entire width of the free distal end of the tab frames at least a partial profile concentric with the central axis of the pocket and similarly shaped, but smaller than, the pocket's cross sectional profile.

* * * * *